(12) United States Patent
Mohrschladt et al.

(10) Patent No.: US 6,703,476 B2
(45) Date of Patent: Mar. 9, 2004

(54) METHOD FOR THE PRODUCTION OF POLYAMIDES

(75) Inventors: Ralf Mohrschladt, Speyer (DE); Helmut Winterling, Ludwigshafen (DE); Dieter Krauss, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/168,955

(22) PCT Filed: Dec. 14, 2000

(86) PCT No.: PCT/EP00/12740
§ 371 (c)(1),
(2), (4) Date: Jun. 24, 2002

(87) PCT Pub. No.: WO01/48053
PCT Pub. Date: Jul. 5, 2001

(65) Prior Publication Data
US 2003/0023027 A1 Jan. 30, 2003

(30) Foreign Application Priority Data
Dec. 23, 1999 (DE) .......................... 199 62 573

(51) Int. Cl.⁷ .................. C08G 69/08; C08G 69/00
(52) U.S. Cl. .............. 528/310; 528/170; 528/312; 528/319; 528/320; 528/322; 528/323
(58) Field of Search .................. 528/170, 310, 528/312, 319, 320, 322, 323

(56) References Cited

U.S. PATENT DOCUMENTS

| 4,629,776 | A |   | 12/1986 | Curatolo |         |
|-----------|---|---|---------|----------|---------|
| 6,194,538 | B1 |   | 2/2001 | Weiss    |         |
| 6,288,207 | B1 | * | 9/2001 | Mohrschladt et al. | 528/310 |
| 6,310,173 | B1 | * | 10/2001 | Mohrschladt et al. | 528/310 |
| 6,316,588 | B1 |   | 11/2001 | Mohrschladt |         |
| 6,359,020 | B1 | * | 3/2002 | Mohrschladt | 521/49.8 |
| 6,525,167 | B1 | * | 2/2003 | Mohrschladt et al. | 528/310 |
| 6,531,570 | B1 | * | 3/2003 | Mohrschladt et al. | 528/310 |

FOREIGN PATENT DOCUMENTS

| DE | 197 09390 | 9/1998 |
| DE | 198 04023 | 8/1999 |
| EP | 479 306   | 4/1992 |

OTHER PUBLICATIONS

Derwent Abst. 98–179394/16.

* cited by examiner

Primary Examiner—P. Hampton Hightower
(74) Attorney, Agent, or Firm—Keil & Weinkauf

(57) ABSTRACT

Polyamides are prepared from aminonitriles and water by (1) reacting the aminonitriles with water at from 180 to 350° C. and such a pressure in the range from 30 to 120 bar that a gaseous phase is present as well as a liquid phase, in a first reaction stage, (2) expanding the reaction mixture obtained in the first reaction stage via an evaporator zone or adiabatically with removal of water and ammonia into a second reaction stage, and (3) postcondensing in the second reaction stage at from 0.1 mbar to 5 bar and from 230 to 320° C.

8 Claims, 2 Drawing Sheets

METHOD FOR THE PRODUCTION OF POLYAMIDES

Figure 1:
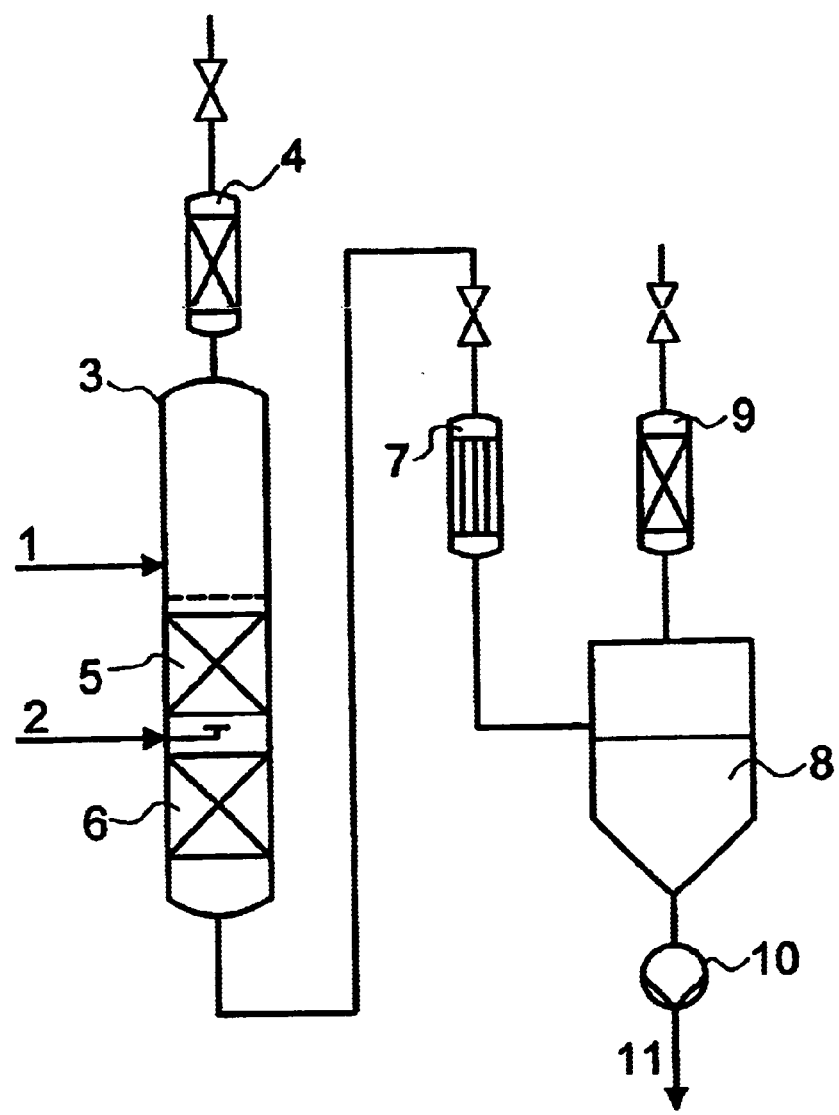

The present invention relates to a process for preparing polyamides from aminonitriles and water.

The reaction of aminonitriles with water to prepare polyamides is known for example from DE-A-197 09 390, where water—aminonitrile reaction mixtures are reacted in a multistep process at high temperatures and pressures in the presence of heterogeneous metal oxide fixed bed catalysts. The catalyst used improves the viscosity buildup and increases the carboxyl end group number in the polyamide. The catalyst can be separated from the reaction product, so that the product properties are not adversely affected by it.

Compared to polyamides polymerized from caprolactam in a conventional manner, the carboxyl end group number of a polyamide prepared from aminocapronitrile (ACN) is frequently significantly lower. In addition, long total reaction mixture residence times are frequently needed to obtain a prepolymer melt that can be pelletized, extracted and dried. As a result of this and because of the large number of reaction stages, the process is not always economically advantageous or is associated with relatively high capital expenditure costs.

It is an object of the present invention to provide a process for preparing polyamides from aminonitriles and water that requires fewer reaction stages and has an improved space-time yield. The process may also preferably lead to an increased carboxyl end group content in the product.

We have found that this object is achieved according to the invention by the process for preparing a polyamide from an aminonitrile and water by (1) reacting the aminonitrile with water at from 180 to 350° C. and such a pressure in the range from 30 to 120 bar that a gaseous phase is present as well as a liquid phase, in a first reaction stage, (2) expanding the reaction mixture obtained in the first reaction stage via an evaporator zone or adiabatically with removal of water and ammonia into a second reaction stage, and (3) postcondensing in the second reaction stage at from 0.1 mbar to 5 bar and from 230 to 320° C.

In one embodiment of the invention, the reacting in the first reaction stage is effected in the presence of a heterogeneous catalyst.

In a further embodiment of the invention, the reaction in the first recation stage is carried out without catalyst and instead the reaction mixture obtained in the first reaction stage is reacted in the presence of a heterogeneous catalyst at from 200 to 320° C. and a pressure at which the reaction mixture is present as a single liquid phase in a further reaction stage between the first reaction stage and the expanding step.

The embodiments thus comprise 2 or 3 process stages, which can be operated continuously or batchwise.

It is common to both the embodiments that, in a first process stage, aminonitriles are reacted with water in a reactor that contains a gas phase as well as a liquid phase, the reaction mixture, and that the components of the gas phase can be separated from the liquid phase via a column.

Useful catalysts for the purposes of the invention include known heterogeneous catalysis metal oxides, such as zirconium oxide, aluminum oxide, magnesium oxide, cerium oxide, lanthanum oxide and preferably titanium dioxide and also beta-zeolites and sheet-silicates. Particular preference is given to titanium dioxide in the anatase form. Preferably the titanium dioxide is at least 70% by weight, particularly preferably at least 90% by weight, especially essentially completely, in the anatase form. We have further found that silica gel, zeolites and doped metal oxides, doped with ruthenium, copper or fluoride for example, distinctly improve the reaction of the reactants mentioned. Useful catalysts are notable in particular for being slightly Brönsted acidic and having a large specific surface area. According to the invention, the heterogeneous catalyst has a macroscopic form permitting mechanical removal of the polymer melt from the catalyst, for example by means of sieves or filters. For example, the catalyst can be used in extrudate pellet form or in the form of a coating on packing elements.

Figure 2:
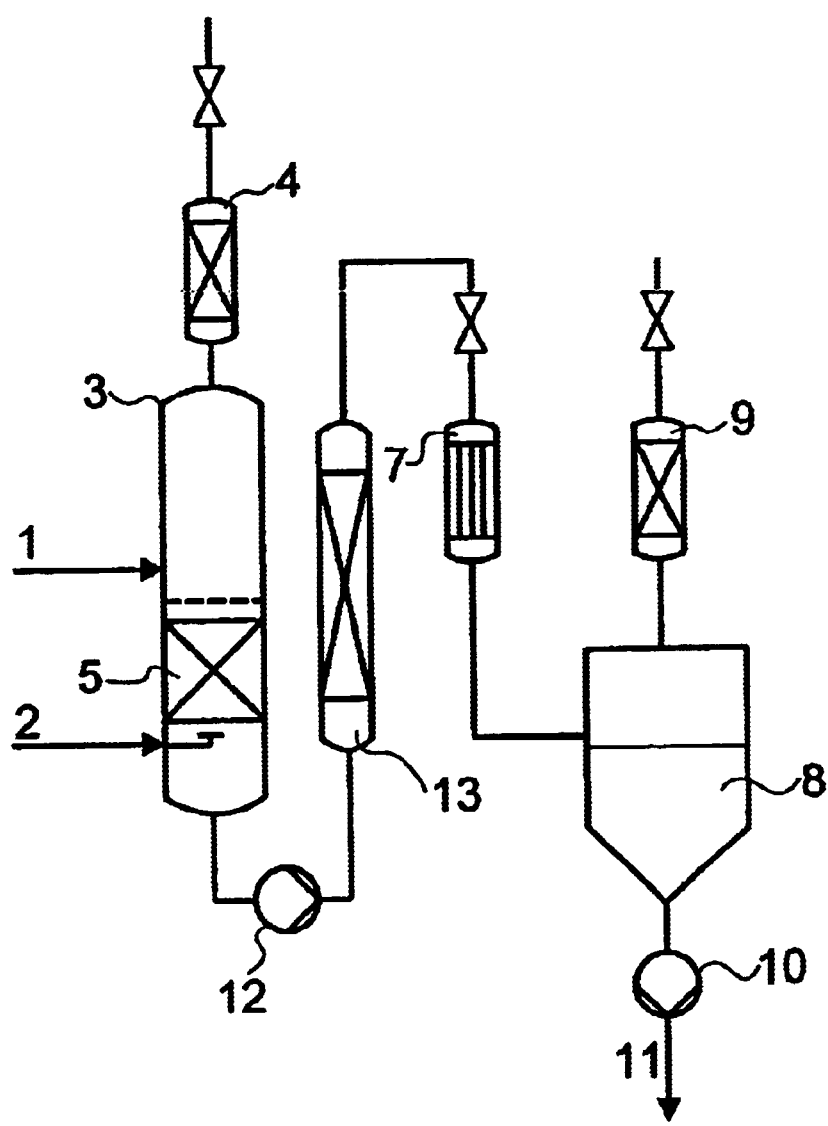

The two embodiments of the present invention will now be more particularly described with reference to the drawing, where FIG. 1 and FIG. 2 are schematics illustrating the two embodiments of the invention. The reference numerals have the following meanings:

| | |
|---|---|
| 1: | aminonitrile feed |
| 2: | water feed |
| 3: | first reaction stage |
| 4: | column |
| 5, 6: | internals coated with the catalyst |
| 7: | evaporator zone |
| 8: | polycondensation stage |
| 9: | column |
| 10: | pump |
| 11: | polyamide exit stream |
| 12: | pump |
| 13: | second reaction stage |

Two-stage Embodiment (see FIG. 1)

The process of the invention is characterized by various reaction zones. The reaction of aminonitrile with water (1) takes place in a first reaction stage (3) at from 180 to 350° C., preferably at 230 to 290° C. The pressure chosen is such that, as well as a liquid phase, there is a gaseous phase which includes especially ammonia and water and can be removed via a column (4). Particularly preferably the pressure is adjusted in such a way that the water content of the reaction mixture remains constant and very large amounts of ammonia can be withdrawn from the gas phase. In a preferred embodiment, the reaction mixture in the reaction stage is continuously supplied with water (2) and continuously dewatered via the gas phase or the column (4). The reaction stage therefore has high pressures in the range from 30 to 120 bar.

According to the invention, the reaction volume contains heterogeneous metal oxide catalysts or internals (5, 6) coated with the metal oxide catalyst. If desired, the reaction zones through which water flows continuously are spatially separated from those reaction zones which contain the catalyst material.

Transfer from the High Pressure into the Low Pressure Stage (Separator or Polycondensation Stage)

The pressurized reaction mixture is subsequently expanded into a polycondensation stage (8) either adiabatically or via an evaporator zone.

Adiabatic Expansion

Adiabatic expansion is preferable when the water content of the reaction mixture is not more than 10% by weight, based on the total mass.

The expansion results in a flash evaporation of the water still present in the polymer through utilization of the heat of reaction or enthalpy previously stored in the polymer melt. In contrast to a conventional evaporation of water on a heat exchanger surface, it is impossible for precipitations onto heat exchanger surfaces and other apparatus surfaces to take place from the polymer matrix in the course of a flash evaporation. Fouling due to organic or inorganic precipitations is avoided. In addition, the heat released in the process is directly utilized for water evaporation, yielding a further energy and cost saving. Moreover, it is desirable for the reaction mixture to cool down, since lowering the temperature will shift the polycondensation equilibrium to the side of the higher molecular weight product. The water vapor released in the course of the expansion includes volatile constituents such as aminonitrile monomer and oligomer. Rectification by a column (9) can be used to remove the water vapor from the system and to recycle the organics back into the process.

Entry into the Second Reaction Stage Via an Evaporator Zone

When the reaction mixture to be introduced into the second polycondensation stage has a high water content (>10% by weight), the use of an evaporator zone (7) will be advantageous. The volatile, low molecular weight components such as water and ammonia in the reaction mixture can transfer into the gas phase there. In addition, the evaporation zone ensures a sufficient input of heat into the reaction mixture to compensate the cooling of the mixture due to water evaporation.

The temperatures in the evaporator zone range from 230 to 350° C., preferably from 250 to 290° C., and the residence time is customarily less than 5 minutes, preferably less than 60 seconds. The evaporator zone is advantageously configured as a tube bundle (7) in which the tubes, if desired, possess cross-sectional constrictions that recur periodically in the axial direction.

Below the evaporator zone the reaction mixture is preferably routed into a mass transfer zone where the pressure and temperature conditions of the evaporation zone are retained. The mass transfer between the liquid and gaseous phase can be continued here and the ammonia separation improved. The tubular mass transfer zone contains internals, for example packing elements such as Raschig rings, metal rings and wire gauze packings in order that a large surface area may be provided. The mass transfer zone used may also take the form of other known evaporator apparatuses such as forced circulation evaporators and thin film evaporators, for example filmtruders or circular disc reactors.

According to the invention, the packings or packing elements are coated with the abovementioned catalyst components, or catalyst pellet is used directly as packing element. This decisively improves the conversion of nitrile and amide groups in the reaction mixture.

Postcondensation

The product obtained after the expanding or after the evaporating in the evaporator zone is subjected in at least one subsequent reaction stage (8), the separator or polycondensation stage, which likewise contains heterogeneous catalysts, if desired, to a postpolymerization or -condensation, if appropriate under reduced pressure, as per known processes. The pressure in this separation zone is generally in the range from 0.1 mbar to 5 bar, preferably in the range from 100 to 1500 mbar, and the temperature in the melt is from 230 to 320° C., preferably from 240 to 290° C., particularly preferably from 250 to 270° C.

Advantageously the components released here into the gas phase are rectified together with the vapors from the evaporation and mass transfer zone in a column (9). The column can be operated for example under the same pressure conditions as the evaporator zone. The rectified ammonia and water vapors are withdrawn at the top of the column and condensed. The water obtained and also the low molecular weight constituents or oligomers deposited at the base of the column can be fed (back) into the reactant stream.

Three-stage Embodiment (See FIG. 2)

The aminonitrile-water mixture is reacted similarly to the two-stage embodiment in a first stage (3) that conforms to the preceding description. However, in the three-stage embodiment, this stage is preferably operated without the use of a catalyst bed.

The catalyst bed is situated in a downstream second reaction stage (13), for example a tube reactor, where the pressure is set so that the reaction mixture is present as a single liquid phase. It is advantageous to use a pump (12) to introduce the reaction mixture into the tube reactor in order that the single-phase nature of the system may be ensured. The temperatures in the tube reactor range from 200 to 320° C., preferably from 210 to 290° C., particularly preferably from 220 to 260° C.

The product of the second stage, again similarly to the two-stage embodiment, is then transferred either adiabatically or via evaporator and mass transfer zones (7) into a third stage (8) for water removal and postcondensation.

Additives

As customary additives it is possible to use pigments, such as titanium dioxide, silicon dioxide or talcum, chain regulators, such as aliphatic and aromatic carboxylic and dicarboxylic acids, such as propionic or terephthalic acid, stabilizers, such as copper(I) and alkali metal halides, nucleating agents, such as magnesium silicate or boron nitride, catalysts, such as phosphorous acid, and also antioxidants in amounts ranging from 0 to 5% by weight, preferably from 0.05 to 1% by weight, based on the total amount of monomers. Additives are generally added prior to pelletizing and before, during or after, preferably after, polymerization. Additives are particularly preferably added to the reaction mixture not until after passage through those reaction zones which contain heterogeneous catalysts.

Further Processing

The polymer (11) obtained according to the invention can then be further processed according to customary processes, for example by converting it by customary methods into piece form by it being extruded in the form of molten profiles, subsequently passed through a water bath for cooling and then pelletized. The pellet can then be extracted in a conventional manner and subsequently or simultaneously converted into high molecular weight polylactam. The extraction can be effected for example with water or aqueous caprolactam solution. Another possibility is gas phase extraction as described for example in EP-A-0284 968. The desired viscosity number for the end product is generally in the range from 120 to 350 ml/g and can be adjusted in a conventional manner.

For further fillers, monomer mixtures, catalysts and workups, see DE-A-197 09 390.

The examples hereinbelow illustrate the invention and demonstrate that the invention permits the preparation of polyamides of high viscosity.

EXAMPLES

Analysis

The relative viscosity (RV) of the extracted product is determined as a measure of the molecular weight buildup and degree of polymerization in 1% by weight of solution in 96% sulfuric acid at 25° C. using an Ubbelohde viscometer.

For extraction, 100 parts by weight of water of polymer are stirred with 400 parts by weight of completely ion-free water at 100° C. for 32 hours under reflux and, after removal of the water, dried gently, ie. without postcondensation, at 100° C. under reduced pressure for 20 hours.

Batchwise Embodiments of Example Processes

Process examples 1, 2, 3 and 4 were carried out batchwise in a 1 l autoclave.

1st Process Stage (High Pressure)

After the reactants have been introduced, the autoclave is sealed, vented and repeatedly purged with nitrogen. After heating to the desired reaction temperature, the reaction mixture is continuously supplied with water through the discharge opening of the vessel with the aid of a piston pump. A valve on the vapor line regulates the internal vessel pressure. The upper part of the reaction volume is stirred.

2nd Process Stage (Postcondensation)

On expiry of the reaction time in the first stage the water supply is interrupted and the pressure and temperature in the reactor are lowered or adjusted over 30–60 minutes to the values required for postcondensation. After the polycondensation phase the polymer melt can be extruded into a water bath, pelletized and dried.

The polymerization examples in the presence of a fixed bed catalyst are carried out using catalyst pellet 4 mm in diameter and from 5 to 20 mm in length prepared from Finnti type S150 titanium dioxide. The titanium dioxide is in the anatase form and is immobilized in the autoclave and separated from the exit stream using sieves.

The composition of the reactant mixtures, the process conditions and the relative viscosities of the polyamides obtained are listed below in Table 1.

TABLE 1

Batchwise embodiments of example processes

| Example | ACN: $H_2O$* | Catalyst | Stage 1 | | | | Pressure reduction [min] | Stage 2 | | | RV |
| | | | P [bar] | T [° C.] | VWD [min] | $H_2O$ [g/h] | | P [bar] | T [° C.] | VWD [min] | |
|---|---|---|---|---|---|---|---|---|---|---|---|
| 1a | 1:4 | none | 30 | 270 | 120 | 60 | 60 | 1 | 270 | 120 | 2.64 |
| 1b | 1:4 | $TiO_2$ | 30 | 270 | 120 | 60 | 60 | 1 | 270 | 120 | 2.95 |
| 2a | 1:4 | none | 30 | 270 | 60 | 120 | 60 | 1 | 270 | 120 | 1.91 |
| 2b | 1:4 | $TiO_2$ | 30 | 270 | 60 | 120 | 60 | 1 | 270 | 120 | 2.35 |
| 3a | 1:2 | none | 30 | 270 | 120 | 60 | 60 | 1 | 270 | 120 | 2.58 |
| 3b | 1:2 | $TiO_2$ | 30 | 270 | 120 | 60 | 60 | 1 | 270 | 120 | 2.92 |
| 4a | 1:6 | none | 30 | 270 | 120 | 60 | 60 | 1 | 270 | 120 | 2.47 |
| 4b | 1:6 | $TiO_2$ | 30 | 270 | 120 | 60 | 60 | 1 | 270 | 120 | 2.75 |

VWD residence time $TiO_2$ titanium dioxide pellet

*Molar ACN/water ratio

RV relative viscosity

We claim:

1. The two-stage process for preparing a polyamide from an aminonitrile and water by reacting said aminonitrile with water at from 180 to 350° C. and such a pressure in the range from 30 to 120 bar that a gaseous phase is present as well as a liquid phase, in a first reaction stage, expanding the reaction mixture obtained in said first reaction stage via an evaporator zone or adiabatically with removal of water and ammonia into a second reaction stage, and postcondensing in said second reaction stage at from 0.1 mbar to 5 bar and from 230 to 320° C.

2. The process of claim 1, wherein said reacting in said first reaction stage is effected in the presence of a heterogeneous catalyst.

3. The three-stage process for preparing a polyamide from an aminonitrile and water by reacting said aminonitrile with water in the absence of a catalyst at from 180 to 350° C. and such a pressure in the range from 30 to 120 bar that a gaseous phase is present as well as a liquid phase, in a first reaction stage, reacting said reaction mixture obtained in said first reaction stage the presence of a heterogeneous catalyst at from 200 to 320° C. and a pressure at which said reaction mixture is present as a single liquid phase, expanding the reaction mixture obtained in said first reaction stage via an evaporator zone or adiabatically with removal of water and ammonia into a second reaction stage, and postcondensing in said second reaction stage at from 0.1 mbar to 5 bar and from 230 to 320° C.

4. The process of claim 1, wherein said catalyst is selected from the group consisting of zirconium oxide, aluminum oxide, magnesium oxide, cerium oxide, lanthanum oxide, titanium dioxide, b-zeolites and sheet-silicates, which may be doped.

5. The process of claim 4, wherein said catalyst is a titanium dioxide that is at least 70% by weight in the anatase form.

6. The process of claim 1, wherein ammonia and water are removed via a column in said first reaction stage.

7. The process of claim 6, wherein the water and ammonia obtained in the last reaction zone are also fed into said column.

8. The process of claim 1, wherein said first reaction stage is continuously supplied with water.

* * * * *

UNITED STATES PATENT AND TRADEMARK OFFICE
CERTIFICATE OF CORRECTION

PATENT NO. : 6,703,476 B2
DATED : March 9, 2004
INVENTOR(S) : Mohrschladt et al.

It is certified that error appears in the above-identified patent and that said Letters Patent is hereby corrected as shown below:

<u>Column 6,</u>
Line 25, "b-zeolites" should be -- β-zeolites --.

Signed and Sealed this

Twenty-second Day of February, 2005

JON W. DUDAS
*Director of the United States Patent and Trademark Office*